US009440591B2

(12) United States Patent
Hendron et al.

(10) Patent No.: US 9,440,591 B2
(45) Date of Patent: Sep. 13, 2016

(54) ENHANCED VISIBILITY SYSTEM (75) Inventors: Scott Svend Hendron, Dubuque, IA (US); Robert Charles Moore, Dickeyville, WI (US); Sean L. Mooney, Galesburg, IL (US); Nicholas E. Bollweg, New Vienna, IA (US); Kurt A. Chipperfield, Boone, IA (US)

(73) Assignee: DEERE & COMPANY, Moline, IL (US)

(*) Notice: Subject to any disclaimer, the term of this patent is extended or adjusted under 35 U.S.C. 154(b) by 502 days.

(21) Appl. No.: 12/465,126

(22) Filed: May 13, 2009

(65) Prior Publication Data
US 2010/0289899 A1 Nov. 18, 2010

(51) Int. Cl.
H04N 7/18 (2006.01)
B60R 9/055 (2006.01)
B60R 1/00 (2006.01)

(52) U.S. Cl.
CPC .......... B60R 9/055 (2013.01); B60R 1/00 (2013.01); B60R 2300/202 (2013.01); B60R 2300/301 (2013.01); B60R 2300/304 (2013.01)

(58) Field of Classification Search
CPC ... B60R 9/055; B60R 1/00; B60R 2300/202; B60R 2300/301; B60R 2300/304
USPC ....... 348/148, 157, 82–86, 39; 345/1.2, 156, 345/659; 382/101
See application file for complete search history.

(56) References Cited

U.S. PATENT DOCUMENTS

| | | | | |
|---|---|---|---|---|
| 4,279,328 A | * | 7/1981 | Ahlbom | 187/224 |
| 4,555,725 A | * | 11/1985 | Geiersbach et al. | 348/120 |
| 4,633,383 A | * | 12/1986 | Omachi et al. | 701/50 |
| 4,776,750 A | * | 10/1988 | Griswold et al. | 414/698 |
| 5,586,620 A | * | 12/1996 | Dammeyer et al. | 187/227 |
| 6,377,277 B1 | * | 4/2002 | Yamamoto | 345/629 |
| 6,417,969 B1 | * | 7/2002 | DeLuca et al. | 359/630 |
| 6,452,544 B1 | * | 9/2002 | Hakala et al. | 342/357.31 |
| 6,809,704 B2 | * | 10/2004 | Kulas | 345/1.2 |
| 6,870,520 B2 | * | 3/2005 | Walker et al. | 345/7 |
| 7,219,769 B2 | * | 5/2007 | Yamanouchi et al. | 187/227 |
| 7,227,976 B1 | * | 6/2007 | Jung et al. | 382/103 |
| 7,320,385 B2 | * | 1/2008 | Katae et al. | 187/227 |
| 7,381,952 B2 | | 6/2008 | Teich et al. | |
| 7,435,177 B1 | * | 10/2008 | Ford | 463/30 |
| 7,561,717 B2 | * | 7/2009 | Anderson | 382/101 |
| 7,605,692 B2 | * | 10/2009 | Yamada et al. | 340/438 |
| 7,967,371 B2 | * | 6/2011 | Khanna et al. | 296/187.01 |
| 7,970,172 B1 | * | 6/2011 | Hendrickson | 382/103 |
| 8,013,838 B2 | * | 9/2011 | Hsu et al. | 345/157 |
| 2003/0234799 A1 | * | 12/2003 | Lee | 345/660 |
| 2004/0070675 A1 | * | 4/2004 | Fredlund et al. | 348/208.1 |
| 2006/0119575 A1 | * | 6/2006 | Richardson et al. | 345/156 |
| 2006/0127880 A1 | * | 6/2006 | Harris et al. | 435/4 |
| 2006/0209013 A1 | * | 9/2006 | Fengels | 345/156 |
| 2008/0011554 A1 | * | 1/2008 | Broesel et al. | 187/224 |
| 2008/0042812 A1 | | 2/2008 | Dunsmoir et al. | |

(Continued)

OTHER PUBLICATIONS

Yoshida, Takumi et al. "Transparent Cockpit: Visual Assistance System for Vehicle Using Retro-reflective Projection Technology," IEEE Virtual Reality, Mar. 2008, pp. 185-188.
Hickley, Matthew "The Terminator-style helmets that allow fighter pilots to see through their planes," Mail Online, Nov. 9, 2007, pp. 1-7.

(Continued)

Primary Examiner — Madhu Woolcock (57) ABSTRACT

An enhanced visibility system for utility vehicles is disclosed. The visibility system may enhance an operator's view from the utility vehicle by making an obstruction appear transparent to the operator.

11 Claims, 7 Drawing Sheets

(56) References Cited

U.S. PATENT DOCUMENTS

| | | | |
|---|---|---|---|
| 2008/0129688 A1* | 6/2008 | Richardson et al. | 345/156 |
| 2008/0180526 A1* | 7/2008 | Trevino | 348/148 |
| 2008/0211771 A1* | 9/2008 | Richardson | 345/158 |
| 2008/0276196 A1 | 11/2008 | Tang | |
| 2008/0309764 A1* | 12/2008 | Kubota et al. | 348/148 |
| 2009/0096994 A1* | 4/2009 | Smits | 353/30 |
| 2009/0201314 A1* | 8/2009 | Tanaka et al. | 345/629 |
| 2009/0295832 A1* | 12/2009 | Takatsuka et al. | 345/659 |
| 2010/0001926 A1* | 1/2010 | Amirparviz et al. | 345/7 |
| 2010/0039515 A1* | 2/2010 | Dietz | 348/148 |
| 2010/0097580 A1* | 4/2010 | Yamamoto et al. | 353/69 |

OTHER PUBLICATIONS

"F-35 HMDS—Joint Strike Fighter Helmet Mounted Display System," Vision Systems International, as early as 2008, also available at http://www.vsi-hmcs.com/f35.htm, 1 page.

"True 6DOF view control offer 3-dimensional virtual reality via motion capture," TrackIR: Vector Expansion, Aug. 2008, also available at http://www.naturalpoint.com/trackir/02-products/product-how-TrackIR-works.html, 2 pages.

Lee, Johnny Chung, "Head Tracking for Desktop VR Displays using the Wii Remote," Projects Wii, as early as 2009, also available at http://www.cs.cmu.edu/~johnny/projects/wii/, 5 pages.

\* cited by examiner

ENHANCED VISIBILITY SYSTEM

FIELD OF THE INVENTION

The present disclosure relates to utility vehicles. More particularly, the present disclosure relates to an enhanced visibility system for utility vehicles.

BACKGROUND OF THE INVENTION

Utility vehicles, such as loaders, motor graders, tractors, bulldozers, feller bunchers, crawlers, excavators, and skidders, include work tools that are configured to perform material handling functions. For example, a loader may include a bucket that is configured to move dirt and other materials. During operation, various components of the utility vehicle may obstruct an operator's view. Such obstructions may include, for example, a boom structure configured to operate the work tool, the work tool itself, a hood of the utility vehicle, a door of the utility vehicle, a part of the chassis, a wheel or tire, or a roll-over protective structure (ROPS).

SUMMARY

The present disclosure provides an enhanced visibility system for utility vehicles. The visibility system may enhance an operator's view from the utility vehicle by making an obstruction appear transparent to the operator.

According to an embodiment of the present disclosure, a utility vehicle is provided. The utility vehicle includes a chassis, at least one ground engaging mechanism configured to propel the chassis over the ground, an operator station supported by the chassis, a work tool configured to move relative to the chassis to move material, and an obstruction positioned between the operator station and the work tool. The utility vehicle also includes at least one camera configured to capture an image of an item positioned beyond the obstruction of the utility vehicle, the obstruction being positioned between the operator station and the item, and a display configured to display at least a portion of the captured image.

According to another embodiment of the present disclosure, a method of enhancing an operator's visibility from a utility vehicle is provided. The utility vehicle includes an obstruction. The method including the steps of providing a display having an outer perimeter, capturing an image of an item, the obstruction of the utility vehicle positioned between the display and the item, providing at least one vantage point of an operator of the utility vehicle, creating a viewing projection from the at least one vantage point through the display, identifying at least a portion of the captured image located within the viewing projection, generating a modified image that includes the identified portion of the captured image, and displaying the modified image on the display.

According to yet another embodiment of the present disclosure, a method of enhancing an operator's visibility from a utility vehicle is provided. The method includes the steps of providing a utility vehicle including a chassis, a work tool configured to move relative to the chassis to move material, and an obstruction, providing a display having an outer perimeter, capturing an image of a scene positioned beyond the obstruction of the utility vehicle, providing at least one vantage point of an operator of the utility vehicle, identifying a portion of the scene visible from the at least one vantage point and through the display, creating a modified image from the captured image that includes the identified portion of the scene, and displaying the modified image on the display.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 1:
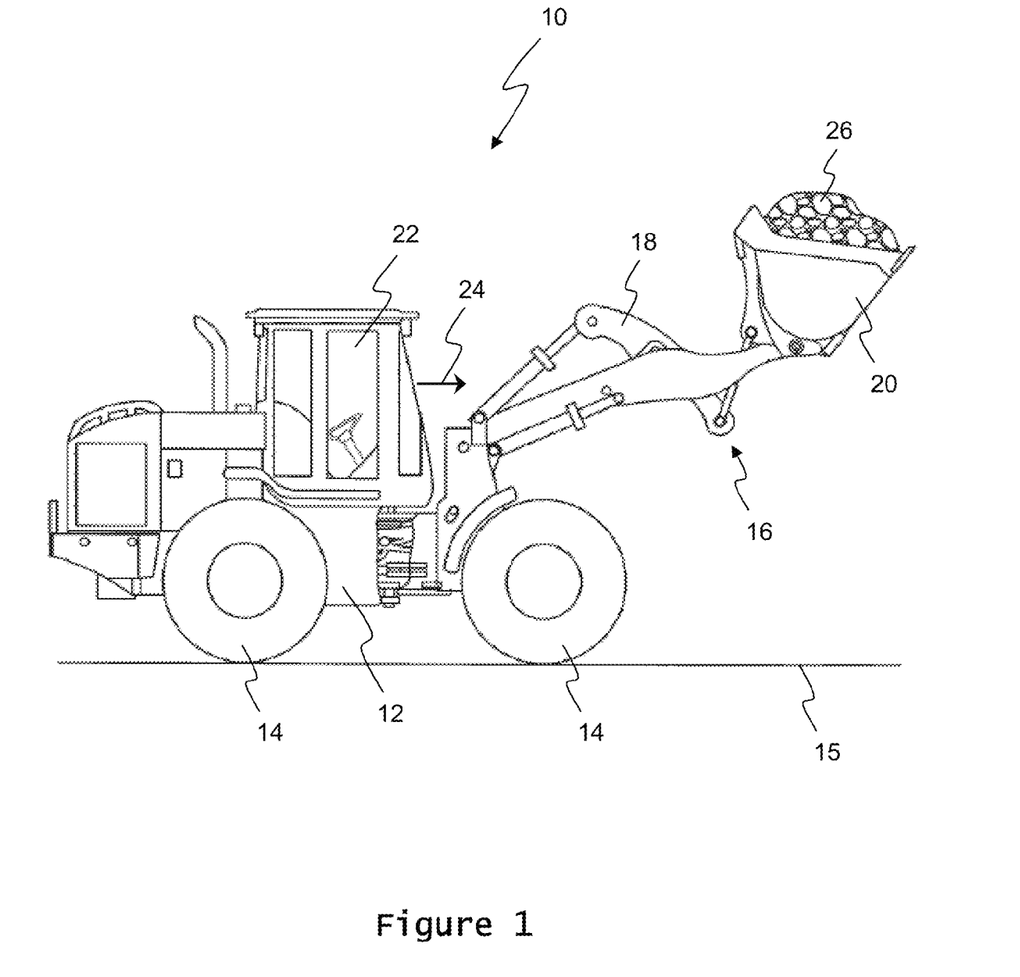
FIG. 1 is an elevational view of an embodiment of a utility vehicle in the form of a loader having a work tool, such as a bucket.

FIG. 1 illustrates a utility vehicle in the form of loader 10. Although the utility vehicle is illustrated and described herein as loader 10, the utility vehicle may include a motor grader, a tractor, a bulldozer, a feller buncher, a crawler, an excavator, a skidder, or another utility vehicle. Loader 10 includes chassis 12 and ground engaging mechanism 14. Ground engaging mechanism 14 is capable of supporting chassis 12 and propelling chassis 12 across the ground 15. Although the illustrated loader 10 includes wheels as ground engaging mechanism 14, loader 10 may include other ground engaging mechanisms, such as steel tracks, rubber tracks, or other suitable ground engaging members.

Loader 10 also includes loader assembly 16. As shown in FIG. 1, loader assembly 16 includes loader boom 18 and work tool 20 in the form of a bucket. Work tool 20 may be capable of moving, excavating, plowing, or performing other material handling functions on load 26, such as dirt or other materials. Other suitable work tools include, for example, blades, pallet forks, bail lifts, augers, harvesters, tillers, mowers, and grapples. Loader boom 18 is configured to move relative to chassis 12 to move and operate work tool 20.

An operator controls the functions of loader 10, including ground engaging mechanism 14 and loader assembly 16, from operator station 22. When facing forward in operator station 22 to operate loader 10, the operator's line of sight, represented schematically as arrow 24, also extends forward from operator station 22. As shown in FIG. 1, loader boom 18 may obstruct line of sight 24 and the operator's ability to view objects from operator station 22. For example, loader boom 18 may obstruct the operator's view of the ground 15, work tool 20, load 26, and/or other utility vehicles.

Figure 2:
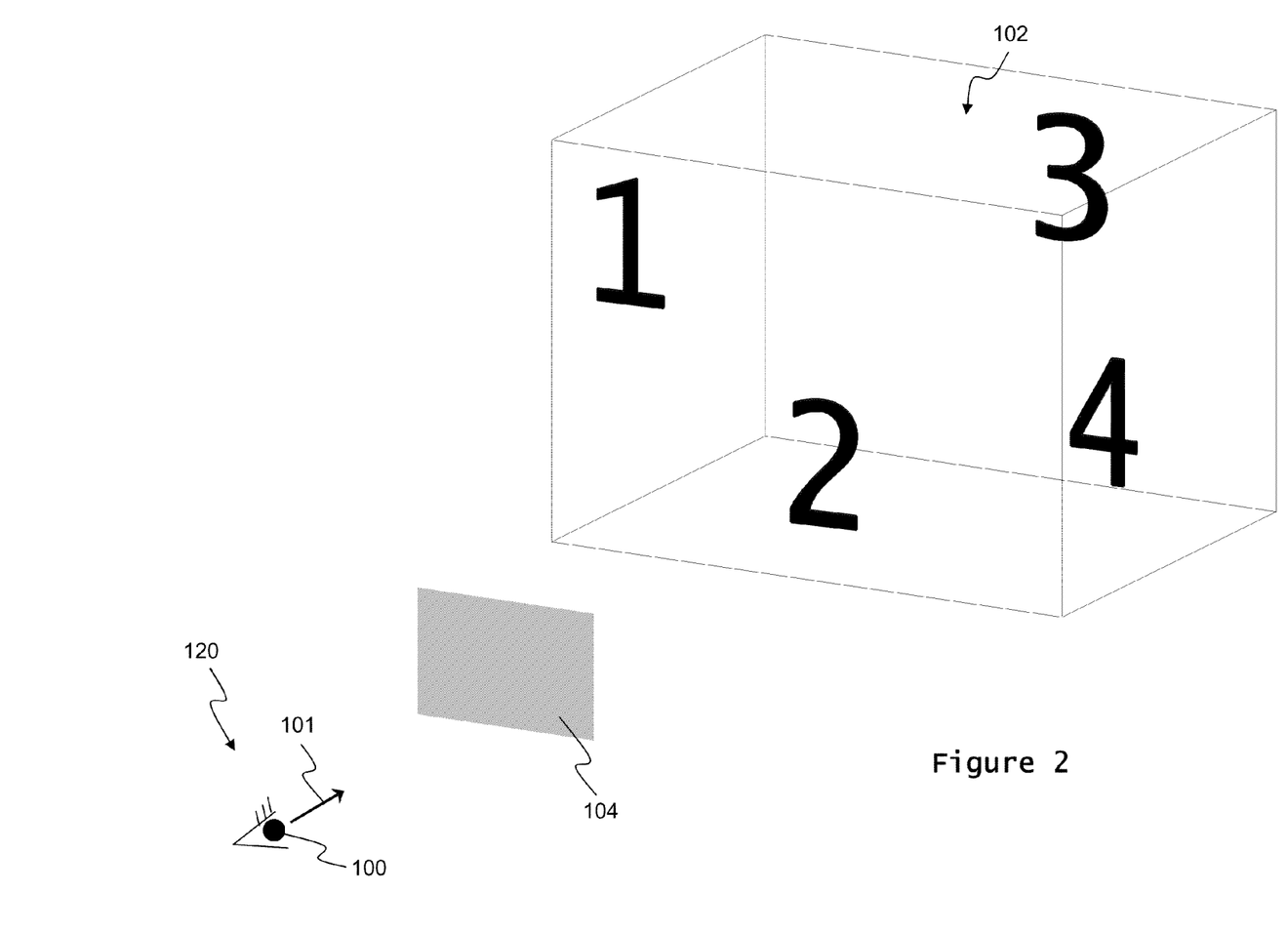
FIG. 2 is a schematic illustration of an environment that includes an observer, an obstruction, and a scene.

Referring next to FIG. 2, a schematic environment includes observer 120 having at least one vantage point 100 from which observer 120 views objects in a scene or area 102. The objects in area 102 are schematically illustrated as Numbers 1-4. From vantage point 100, observer 120 has a line of sight, represented schematically as arrow 101, that is obstructed by an opaque obstruction 104, so observer 120 cannot see some of area 102. For example, in the illustrated embodiment of FIG. 2, observer cannot see the bottom portion of area 102, including the number 2. Comparing FIGS. 1 and 2, observer 120 may represent an operator seated in operator station 22 of loader 10, and obstruction 104 may represent loader boom 18, for example.

To enhance the operator's view from operator station 22, the present disclosure provides an enhanced visibility system for loader 10. An exemplary visibility system is illustrated schematically in FIGS. 3-5.

Figure 3:
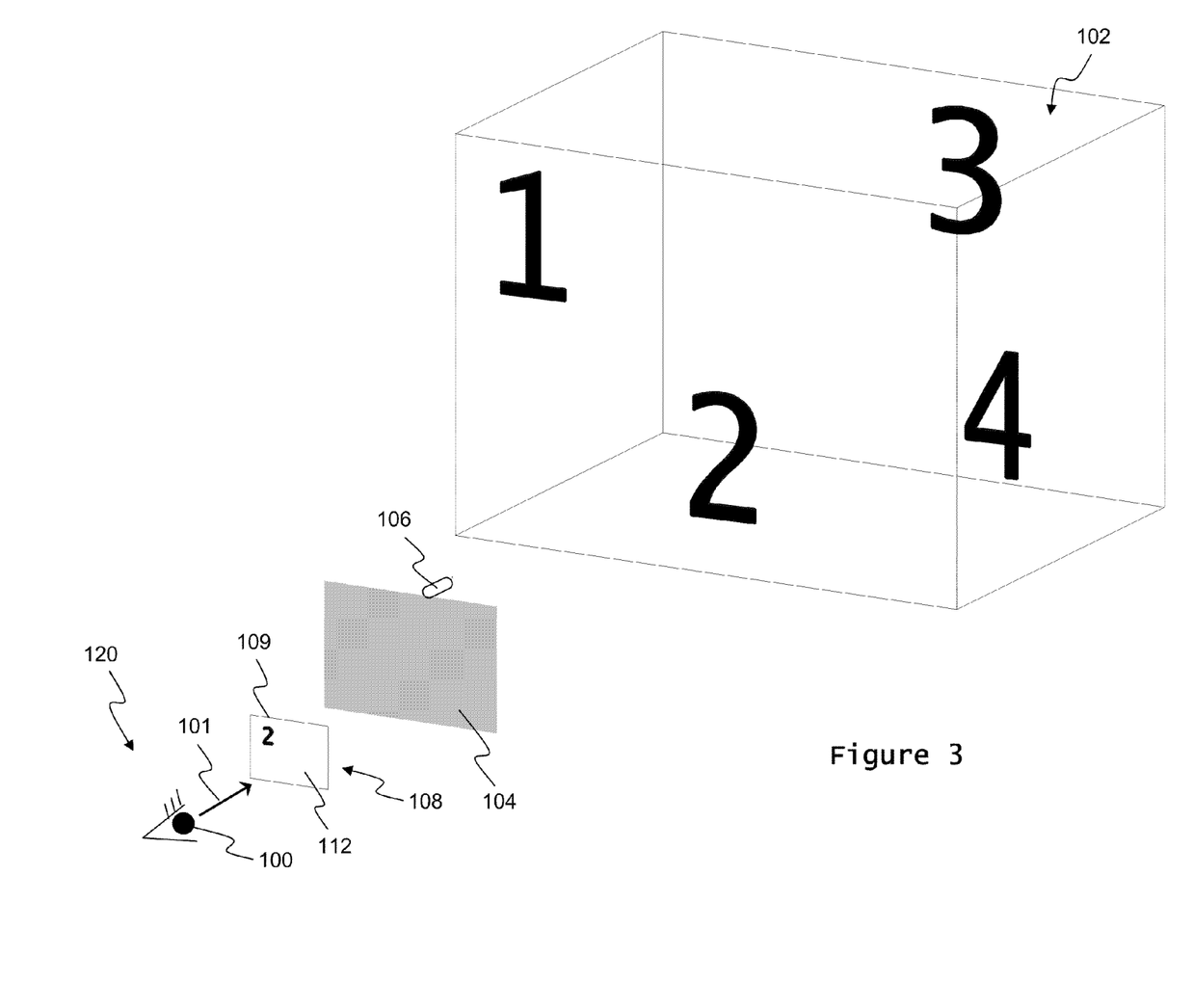
FIG. 3 is a schematic illustration of the environment of FIG. 2, further including an enhanced visibility system of the present disclosure that includes a camera and a display.
Figure 4:
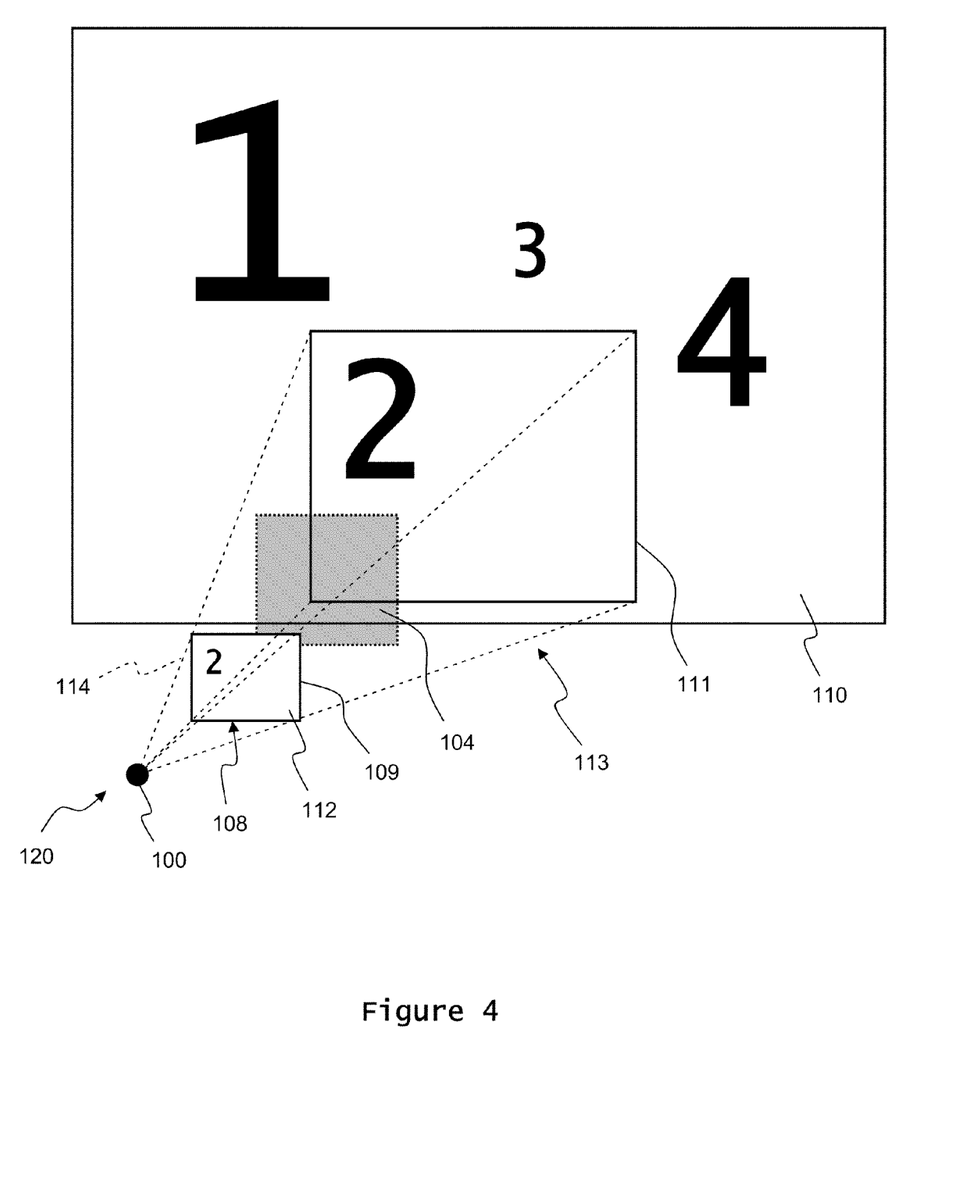
FIG. 4 is another schematic illustration of the enhanced visibility system of FIG. 3 shown from a first vantage point of the observer.
Figure 4A:
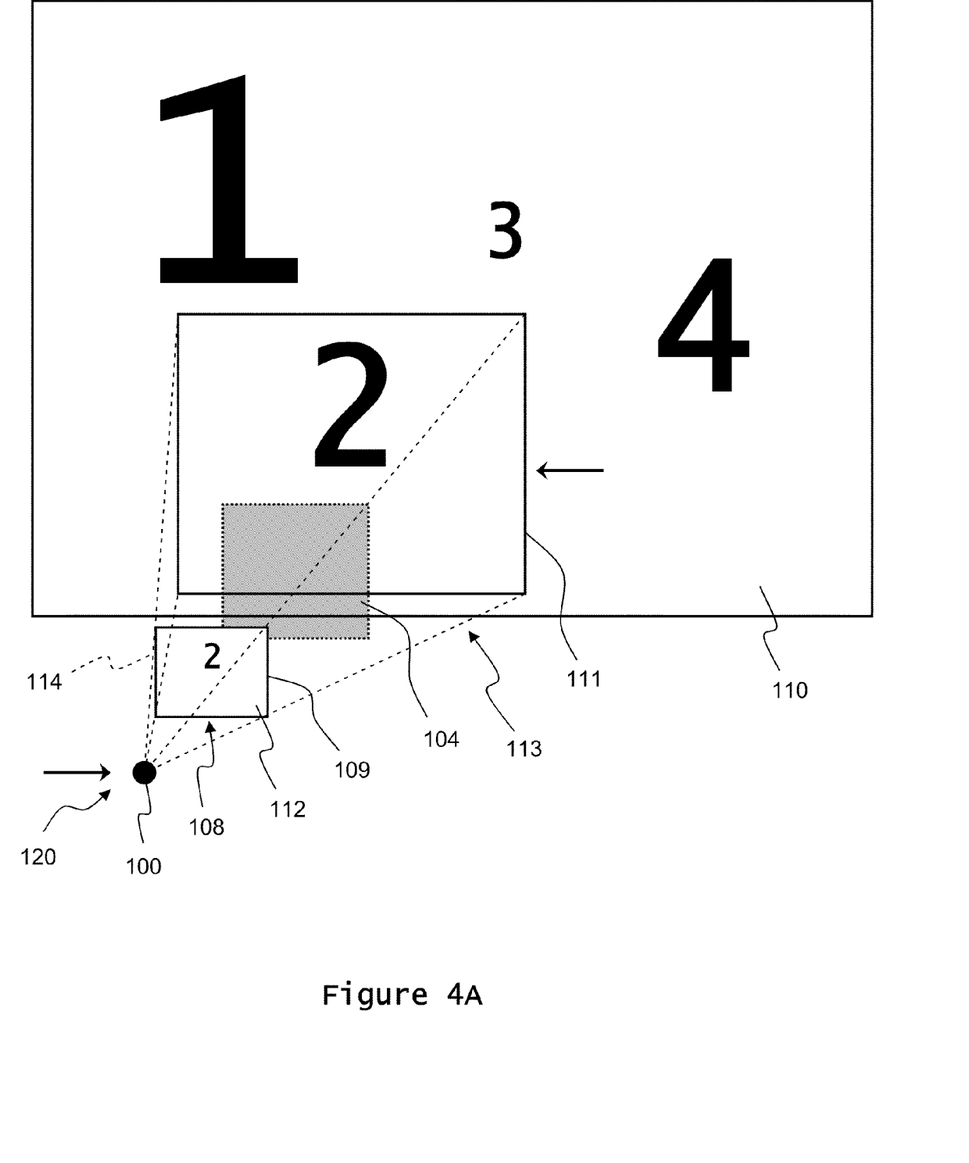
FIG. 4A is a schematic illustration similar to FIG. 4 shown from a second vantage point of the observer.

Referring to FIGS. 3 and 4, an exemplary visibility system of the present disclosure includes camera 106 and display 108. In use, camera 106 captures an unobstructed image of area 102, referred to herein as captured image 110. In other words, captured image 110 is not obstructed or blocked by obstruction 104. Then, observer 120 views modified image 112 on display, which includes at least a portion of captured image 110. Viewing modified image 112 on display makes obstruction 104, and display 108 itself, appear transparent. As shown in FIG. 3, modified image 112 corresponds with the portion of area 102 that would be visible by observer 120 looking through a transparent display 108 from vantage point 100 without any obstructions present behind the display 108. In other words, modified image 112 corresponds with the portion of area 102 that would be visible by observer 120 from vantage point 100 within the perimeter of a transparent display 108 without any obstructions present behind the display 108. Thus, display 108 may function like a virtual window.

According to an exemplary embodiment of the present disclosure, and as shown in FIGS. 3 and 4, modified image 112 is generated by creating a viewing projection 113 from vantage point 100 through display 108 and identifying at least a portion of captured image 110 located within viewing projection 113, which portion is referred to herein as identified portion 111. For example, an outer boundary of viewing projection 113 may be defined by extending a plurality of rays 114 linearly from vantage point 100 of observer 120 through outer perimeter 109 of display 108, including the outer corners of display 108. As shown in FIG. 4, identified portion 111 of captured image 110 is located within the outer boundary, or rays 114, of viewing projection 113.

Figure 5:
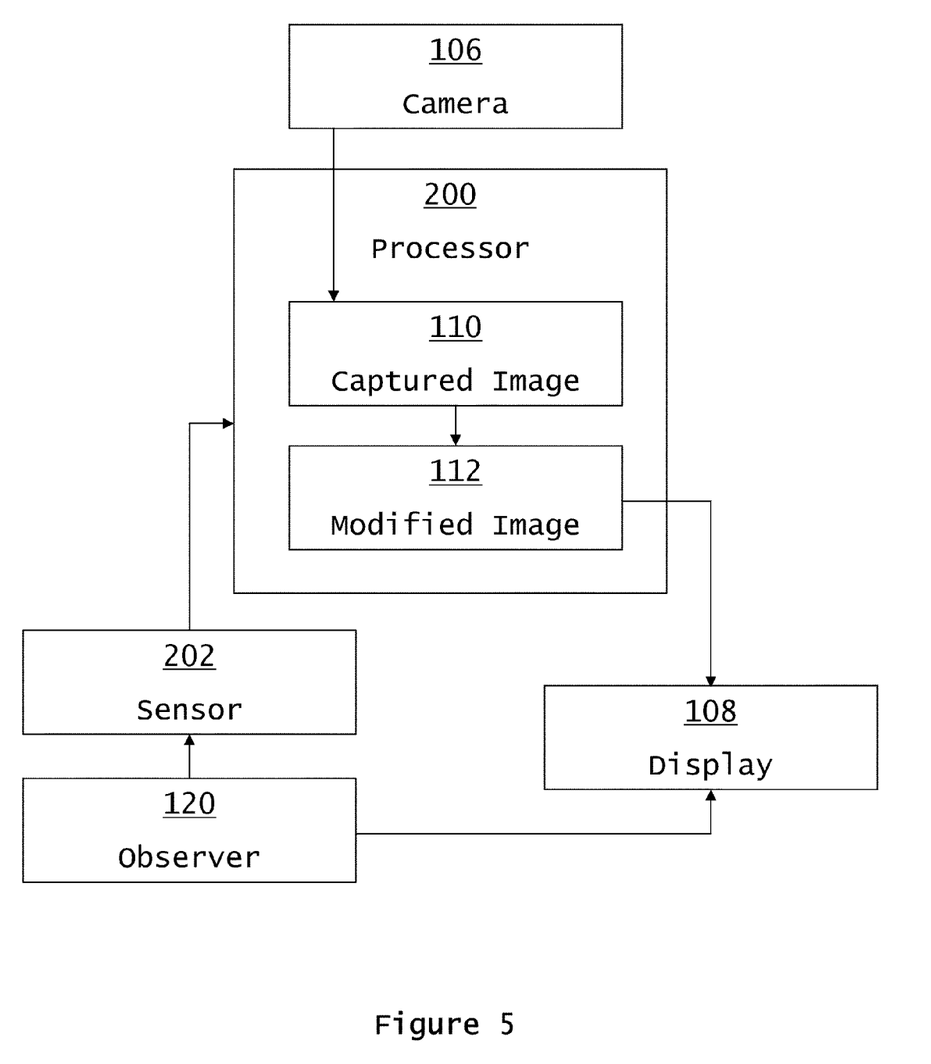
FIG. 5 is a block diagram of an enhanced visibility system of the present disclosure.

FIG. 5 shows a block diagram of an exemplary visibility system of the present disclosure. The illustrated visibility system includes processor 200. Processor 200 may include a digital module, such as a computer, that is configured to receive and process inputs. For example, processor 200 may be configured to receive and process inputs from electronic devices of the visibility system, such as camera 106 and sensor 202. As another example, processor 200 may be configured to receive and process user inputs, such as inputs from observer 120. Additionally, processor 200 may be configured to output processed information. For example, processor 200 may be configured to output processed information to display 108. Processor 200 may be configured to receive and output information over a wired or wireless communication links.

First, image 110 of area 102 is captured by camera 106. Like area 102 itself, captured image 110 of area 102 corresponds to a location beyond obstruction 104. For example, captured image 110 of area 102 may correspond to a location in the image plane of camera 106, which lies beyond obstruction 104 and perpendicular the optical axis of camera 106. According to an exemplary embodiment of the present disclosure, captured image 110 is a video image. It is also within the scope of the present disclosure that captured image 110 may be a still image. Therefore, camera 106 may include, for example, a digital still camera, such as a digital still camera that is capable of capturing a high number of images or frames per second, an analog video camera, a digital video camera, a Webcam, or another suitable image capturing device.

Captured image 110 may be an actual image captured directly by camera 106, or captured image 110 may be a virtual image. For example, a "video view interpolation" technique may be used to construct a virtual image by combining a plurality of images captured by an array of individual cameras. Using a plurality of cameras may provide more flexibility as to camera placement. For example, if only a single camera is used, the camera may have to be positioned in a confined location or a location that is exposed to harsh environmental conditions so that the camera is able to capture an unobstructed image. On the other hand, if multiple cameras are used, the cameras may avoid placement in confined or exposed locations, because each camera may be responsible for capturing a part of the final virtual image.

According to an exemplary embodiment of the present disclosure, captured image 110 is stored in processor 200, as shown in FIG. 5. If captured image 110 is captured directly by camera 106, camera 106 may communicate with processor 200 to send captured image 110 from camera 106 to processor 200 for storage. If captured image 110 is a virtual image, multiple cameras 106 may communicate with processor 200 to send a plurality of images to processor 200. Then, processor 200 may receive and combine the plurality of images to generate captured image 110.

Next, captured image 110 is located relative to display 108. Captured image 110 and display 108 may be placed on a coordinate grid to locate captured image 110 relative to the display 108, including, for example, the distance between the components and the relative orientation of the components. The location of captured image 110 may be fixed relative to display 108. For example, if the location of camera 106 is fixed relative to display 108, and the location of captured image 110 is fixed relative to camera 106, the location of captured image 110 will be fixed relative to display 108. Alternatively, the location of captured image 110 relative to display 108 may vary. For example, if display 108 is a portable, handheld device, the location of captured image 110 relative to display 108 may vary. The relative location of captured image 110 may be determined using intrinsic settings of camera 106, laser range finding technology, sonar range finding technology, stereoscopic technology, or light detection and ranging (LIDAR) technology, for example.

According to an exemplary embodiment of the present disclosure, processor 200 may be used to locate captured image 110 relative to display 108. For example, processor 200 may receive inputs from camera 106 and display 108 to locate captured image 110 relative to display 108.

Next, observer 120 is located relative to display 108. More particularly, at least one vantage point 100 of observer 120 is located relative to display 108. Vantage point 100 and display 108 may be placed on a coordinate grid, such as the same coordinate grid that also includes captured image 110, to locate vantage point 100 relative to display 108. According to an exemplary embodiment of the present disclosure, locating vantage point 100 relative to display 108 may involve performing a ray tracing method. For example, referring back to FIG. 4, a plurality of rays 114 may be traced linearly from vantage point 100 of observer 120 through outer perimeter 109 of display 108, including the outer corners of display 108.

The visibility system of the present disclosure may further include a suitable sensor 202 to track movement of observer 120 relative to display 108, as shown in FIG. 5. According to an embodiment of the present disclosure, sensor 202 is an active sensor that sends energy toward a target and detects the energy reflected by the target. According to an alternative embodiment of the present disclosure, sensor 202 is a passive sensor that detects or reflects energy generated by an independent source. Suitable sensors 202 may include, for example, accelerometers, position sensors, gyroscopes, distance sensors, biological sensors, geodetic sensors, video sensors, optical sensors, radio frequency (RF) sensors, infrared sensors, light sensors, image sensors, photocell sensors, or electroencephalography (EEG) sensors, for example. A suitable sensor may include a camera, for example, that utilizes feature recognition software.

If necessary, observer 120 may wear a sensor target. For example, observer 120 may wear reflective spheres or reflective tape to be targeted and detected by an active optical sensor. As another example, observer 120 may wear at least one infrared light emitting diode (LED) to be detected by an infrared sensor. An exemplary visibility system utilizes a Wii™ Remote, which is generally available from Nintendo of America Inc., as the infrared sensor to detect movement of a Wii™ sensor bar mounted to safety glasses worn by observer 120, the Wii™ sensor bar having a plurality of infrared LED's. Other exemplary detection systems do not require that observer 120 wear a sensor target. For example, the visibility system may utilize feature recognition cameras and software, such as the ZCam™ camera generally available from 3DV Systems. As another example, the visibility system may utilize pupil-tracking products or face-tracking products, such as TrackIR™ products generally available from NaturalPoint, Inc.

According to an exemplary embodiment of the present disclosure, locating observer 120 relative to display 108 is performed using processor 200, as shown in FIG. 5. When sensor 202 senses movement of observer 120, sensor 202 sends a signal to processor 200. Then, processor 200 analyzes the signal from sensor 202 to determine vantage point 100 of observer 120. For example, if using a pupil-tracking product, processor 200 may position vantage point 100 between the tracked pupils of observer 120. As another example, if using a Wii™ Remote as sensor 202, processor 200 may position vantage point 100 between the tracked infrared LED's on the Wii™ sensor bar. It is also within the scope of the present disclosure that processor 200 may assign multiple vantage points 100 to more accurately replicate the behavior of a set of human eyes.

Based on the relative positions of captured image 110, vantage point 100, and display 108, modified image 112 is created from captured image 110. As shown in FIGS. 3 and 4, modified image 112 corresponds with the portion of area 102 that would be visible by observer 120 looking through a transparent display 108 from vantage point 100 without any obstructions present behind the display 108. Thus, display 108 may function as a virtual window.

According to an exemplary embodiment of the present disclosure, and as shown in FIG. 4, modified image 112 is generated by creating a viewing projection 113 from vantage point 100 of observer 120 through display 108 and then identifying portion 111 of captured image 110 located within viewing projection 113. In this embodiment, generating modified image 112 may involve winnowing captured image 110 to include only identified portion 111—the portion located within viewing projection 113.

As vantage point 100 changes, identified portion 111 of captured image 110 may also change such that display 108 displaying modified image 112 functions as a virtual window. For example, when a person approaches an ordinary glass window, the person's field of view through the window increases. Thus, as observer 120 approaches display 108 in a direction substantially perpendicular to display 108, the size of identified portion 111 of captured image 110 increases such that observer 120 sees more of area 102 in modified image 112 on display 108. Similarly, when a person moves away from an ordinary glass window, the person's field of view through the window decreases. Thus, as observer 120 moves away from display 108 in a direction substantially perpendicular to display 108, the size of identified portion 111 of captured image 110 decreases such that observer 120 sees less of area 102 in modified image 112 on display 108. As another example, when a person moves to the right side of an ordinary glass window, the person's field of view to the left of the window increases, and vice versa. Thus, as shown by comparing FIGS. 4 and 4A, when observer 120 moves rightward relative to display 108 in a plane substantially parallel to display 108, identified portion 111 of captured image 110 moves leftward such that observer 120 sees a left side portion of area 102 in modified image 112 on display 108.

In an embodiment, creating modified image 112 may involve adjusting the settings or position of camera 106. For example, camera 106 may be zoomed in/out, panned up/down, panned left/right, and/or tilted, to produce modified image 112. Camera 106 may be adjusted mechanically, such as by utilizing a servo-driven, gimbal-mounted camera, for example. Alternatively, camera 106 may be adjusted digitally, such as by utilizing a camera with digital pan and zoom features. Such digital cameras may utilize digital signal processors (DSP's) and are generally available from suppliers such as KT&C USA, Inc. These adjustments to camera 106 may be directed by processor 200.

In another embodiment, creating modified image 112 may involve altering captured image 110 itself. For example, if captured image 110 is a virtual image, such as a virtual image stored in processor 200, a suitable software program may be used to zoom in/out of the virtual image, pan up/down over the virtual image, pan left/right over the virtual image, and/or rotate the virtual image, to show only identified portion 111 of captured image 110. For example, by mapping the virtual captured image 110 onto a virtual planar surface, zoom and pan features available in a CAD software program may be used to create modified image 112.

Creating modified image 112 may also involve performing a "texture mapping" algorithm. Referring to FIGS. 3 and 4, a "texture mapping" algorithm may be performed to ensure that modified image 112 appears proportionate and realistic to observer 120, not distorted or unrealistic. For example, a "texture mapping" algorithm may be performed if observer 120 moves relative to display 108 such that line of sight 101 from vantage point 100 substantially deviates from being perpendicular to display 108. As another example, a "texture mapping" algorithm may be performed if display 108 includes a substantially non-planar viewing surface, such as a flexible display that is configured to be wrapped around a non-planar surface, as discussed below. Creating modified image 112 may also involve adding three-dimensional effects to captured image 110, overlaying a grid system on captured image 110, or performing other suitable modifications to captured image 110, for example.

Finally, modified image 112 is displayed on display 108, as shown in FIGS. 3 and 4. Observer 120 then views modified image 112 on display 108, which makes obstruction 104, and display 108 itself, appear transparent. As shown in FIG. 4, displaying modified image 112 on display 108 may involve altering the scale of identified portion 111 of captured image 110.

According to an exemplary embodiment of the present disclosure, display 108 may be a static device. In one embodiment, display 108 is capable of generating an image. For example, display 108 may include a television monitor, a liquid crystal display (LCD) monitor, a light-emitting diode (LED) monitor, a thin-film transistor (TFT) monitor, a cathode ray tube (CRT) monitor, a heads up display, or a head mounted display. In another embodiment, display 108 is capable of reflecting an image generated by another source. For example, display 108 may include a projection surface or any other retro-reflective surface. Display 108 may also include a three-dimensional display, such as a three-dimensional display that utilizes multi-camera interlaced images and lenticular surfaces.

According to another exemplary embodiment of the present disclosure, display 108 may be a portable device. For example, display 108 may include a monitor of a portable electronic device, such as the monitor of a cellular telephone or a personal digital assistant (PDA). An exemplary portable electronic device includes an iPhone™ generally available from Apple Inc.

Display 108 may include a non-rectangular viewing surface and/or a non-planar viewing surface. For example, display 108 may include a flexible display that is configured to be wrapped around a non-planar surface. An exemplary display is the Flexible Organic LED (FOLED™) generally available from Universal Display Corporation. It is within the scope of the present disclosure that a flexible display, such as the FOLED™, may be wrapped around obstruction 104 itself The above-mentioned "texture mapping" algorithms may be performed to ensure that modified image 112 displayed on the flexible, wrapped display 108 appears proportionate and realistic to observer 120.

According to an exemplary embodiment of the present disclosure, processor 200 may be used to store modified image 112 and transmit modified image 112 to display 108, as shown in FIG. 5. For example, display 108 may be wired to processor 200. As another example, processor 200 may transmit modified image 112 to a website, and then display 108 may access the website.

Figure 6:
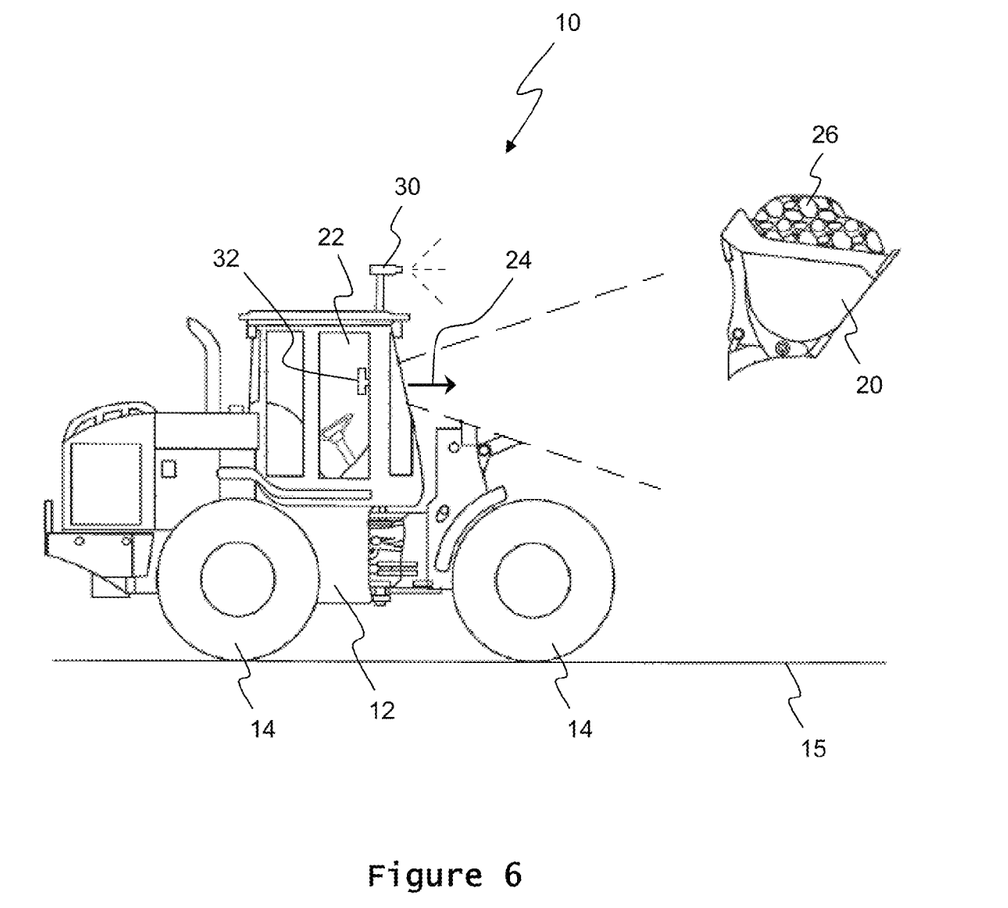
FIG. 6 is an elevational view of the utility vehicle of FIG. 1, further including an enhanced visibility system of the present disclosure that includes a camera and a display.

An enhanced visibility system, such as the visibility system described above and illustrated schematically in FIGS. 3-5, may be incorporated into loader 10 to enhance the operator's view from operator station 22. As shown in FIG. 6, loader 10 includes camera 30 and display 32. Camera 30 and display 32 may be statically mounted to loader 10 or portable devices, as discussed above. In use, camera 30 captures an unobstructed image of the surrounding environment. For example, camera 30 may be positioned to capture an image of the ground 15 and/or work tool 20 without interference from loader boom 18. Then, the operator views a portion of the unobstructed, captured image on display 32, which makes the obstruction, such as loader boom 18 (FIG. 1), appear transparent, as illustrated schematically in FIG. 6.

The visibility system of the present disclosure may provide the operator of loader 10 with a realistic image along line of sight 24, because display 32 may function like a virtual window from loader 10. For example, a forward-facing operator may drive loader 10 and operate work tool 20 while looking through display 32. In contrast, a forward-facing automobile driver viewing a back-up camera must mentally translate and manipulate the forward-displayed image to its actual, rearward location.

Also, the visibility system of the present disclosure may improve the operator's confidence and productivity. By reducing or eliminating visual obstructions, the operator may have an improved view of the ground 15, work tool 20, load 26, and other vehicles, for example. Therefore, the operator's accuracy and efficiency may improve. In addition, the operator may be able to work in otherwise adverse conditions, such as during the night using, for example, infrared illumination.

Further, the visibility system of the present disclosure may reduce the costs of manufacturing and operating loader 10. For example, the visibility system of the present disclosure may reduce or eliminate the need for windows on loader 10. As a result, the heat load on operator station 22 may decrease, allowing smaller coolers and fans to be used in operator station 22. Also, the need for windshield wipers may be avoided.

EXAMPLE

An enhanced visibility system was installed in a John Deere utility vehicle and evaluated. The visibility system included a Microsoft LifeCam 6000 camera and a Philips™ 17" flat screen computer monitor. The visibility system also included a Wii™ Remote to track the position of the vehicle operator. The components of the visibility system communicated with a dual-core processing computer utilizing Microsoft DirectX™ software.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:
1. A utility vehicle including:
a chassis;
at least one ground engaging mechanism configured to propel the chassis over the ground;
an operator station supported by the chassis;
a work tool configured to move relative to the chassis to move material;
an obstruction of the utility vehicle positioned between the operator station and the work tool, the obstruction having a surface area obstructing a view of an operator in the operator station from a vantage point;
at least one camera configured to capture an unobstructed image of the work tool, the at least one captured unobstructed image positioned beyond the obstruction of the utility vehicle, the obstruction being positioned between the operator station and the work tool; and a display functioning as a virtual window for displaying a modified image based on the captured unobstructed image, the modified image formed by creating a viewing projection from the vantage point of the operator and identifying at least a portion of the captured unobstructed image located within the viewing projection, the viewing projection having an outer boundary defined by a plurality of outwardly projected rays centered at the vantage point of the operator and extending linearly toward the obstruction and through an outer perimeter of the display, the projected rays being outwardly spaced apart from the surface area of the obstruction, and the modified image corresponding to an area that would be visible from the vantage point of the operator without the obstruction to make the obstruction and the display appear transparent to the operator.

2. The utility vehicle of claim 1, wherein the display is mounted in the operator station and the obstruction is positioned between the display and the work tool.

3. The utility vehicle of claim 1, wherein the operator station provides at least one vantage point for an operator and the display is positioned laterally and longitudinally between the at least one vantage point and the obstruction of the utility vehicle.

4. The utility vehicle of claim 1, wherein the obstruction is positioned longitudinally forward of the operator station.

5. The utility vehicle of claim 1, wherein the work tool includes at least one of a bucket, a blade, a pallet fork, a bail lift, an auger, a harvester, a tiller, a mower, and a grapple.

6. The utility vehicle of claim 1, wherein the obstruction includes at least one of:
    a hood of the utility vehicle;
    a door of the utility vehicle;
    a roll-over protective structure of the utility vehicle; and
    a boom structure coupled to the work tool and the chassis for movement of the work tool relative to the chassis.

7. The utility vehicle of claim 1, further including:
    a sensor configured to track movement of an operator in the operator station; and
    a processor configured to communicate with the sensor and the display.

8. The utility vehicle of claim 1, further including:
    a sensor configured to detect an operator in the operator station; and
    a processor configured to receive an input from the sensor and to identify the portion of the captured image based on the input from the sensor.

9. The utility vehicle of claim 8, wherein the processor is also configured to identify at least one vantage point of the operator based on the input from the sensor.

10. The utility vehicle of claim 1, wherein the display is configured to generate the portion of the captured image.

11. The utility vehicle of claim 10, wherein the display includes at least one of a television monitor, a liquid crystal display monitor, a light-emitting diode monitor, a thin-film transistor monitor, a cathode ray tube monitor, a heads up display, and a head mounted display.

\* \* \* \* \*